(12) United States Patent
Lin

(10) Patent No.: US 11,981,399 B1
(45) Date of Patent: May 14, 2024

(54) BICYCLE DERAILLEUR STRUCTURE

(71) Applicant: Fong P Lin, Cerritos, CA (US)

(72) Inventor: Fong P Lin, Cerritos, CA (US)

( * ) Notice: Subject to any disclaimer, the term of this patent is extended or adjusted under 35 U.S.C. 154(b) by 0 days.

(21) Appl. No.: 18/216,551

(22) Filed: Jun. 29, 2023

(30) Foreign Application Priority Data

May 9, 2023 (TW) .................................. 112117201

(51) Int. Cl.
*B62M 9/122* (2010.01)
*B62M 25/04* (2006.01)

(52) U.S. Cl.
CPC ............ *B62M 9/122* (2013.01); *B62M 25/04* (2013.01)

(58) Field of Classification Search
CPC ...... B62M 9/124; B62M 25/08; B62M 9/122; B62M 9/1242; B62M 2009/12413; B62M 9/132; B62M 9/121; B62M 9/1342; B62M 9/134
USPC .......................................................... 474/80
See application file for complete search history.

(56) References Cited

U.S. PATENT DOCUMENTS

| | | | | |
|---|---|---|---|---|
| 4,824,420 A * | 4/1989 | Romano | ................ | B62M 9/124 474/78 |
| 4,946,425 A * | 8/1990 | Buhlmann | ............. | B62M 9/122 280/238 |
| 5,358,451 A * | 10/1994 | Lacombe | ................ | B62M 9/124 474/78 |
| 5,494,307 A * | 2/1996 | Anderson | .............. | B62M 9/122 280/236 |
| 5,649,877 A * | 7/1997 | Patterson | ............. | B62M 9/1344 474/80 |
| 7,255,660 B2 * | 8/2007 | Del Pra | ................... | B62M 9/122 474/82 |
| 7,563,186 B2 * | 7/2009 | Mercat | ..................... | B62M 9/12 474/70 |
| 8,678,964 B2 * | 3/2014 | Lin | ........................ | B62M 9/124 474/80 |
| 8,845,467 B2 * | 9/2014 | Lin | ........................ | B62M 9/124 474/82 |
| 9,033,833 B2 * | 5/2015 | Johnson | ................ | B62K 23/04 474/82 |
| 9,085,340 B1 * | 7/2015 | Sala | ........................ | B62M 9/132 |
| 9,102,379 B2 * | 8/2015 | Capògna | ................ | B62M 9/132 |
| 10,207,772 B2 * | 2/2019 | Johnson | ................ | B62M 25/04 |
| 2013/0281237 A1 * | 10/2013 | Lin | ........................ | B62M 9/124 474/80 |
| 2014/0155206 A1 * | 6/2014 | Johnson | ................ | B62K 23/06 474/80 |

\* cited by examiner

*Primary Examiner* — Henry Y Liu
(74) *Attorney, Agent, or Firm* — Leong C. Lei

(57) ABSTRACT

A bicycle derailleur structure is mounted on a bicycle frame to correspond to a flywheel unit and includes a support arm, a screw rod, a tension bar, a gear shift unit, and a drive unit. The tension bar has an end having an interior space receiving an elastic member therein to be mounted on the support arm in an elastically oscillating manner. The gear shift unit includes two protector plates in threading engagement with screw rod, and first and second pulleys arranged between the two protector plates. The screw rod is operable to drive the gear shift unit in order to align a chain on the flywheel unit to align with the gear shift unit.

10 Claims, 11 Drawing Sheets

BICYCLE DERAILLEUR STRUCTURE

TECHNICAL FIELD OF THE INVENTION

The present invention relates to a derailleur structure, and more particularly to a bicycle derailleur structure that includes a screw rod operable to drive a gear shift unit, preventing sideway bending of a chain to gain a maximum efficiency, smoothening gear shifting and speed varying, enabling increase of available speed positions for speed varying, reducing probability of damage and malfunction, preventing a distance between the gear shift unit and the ground surface from being excessively short, and reducing impact with ground and damage.

DESCRIPTION OF THE PRIOR ART

A bicycle variable-ratio gearing system is, so to speak, the most vital component of a bicycle structure, which offers the primary function of converts a pedaling force that a user applies into the power of the bicycle. The bicycle variable-ratio gearing system generally includes a front derailleur and a rear derailleur, of which the mechanisms have to be precise and impact-durable.

For the rear derailleur of a bicycle, the structure and principle are such that a rear shift lever is operated and the shift lever pulls a chain shift cable to allow the chain shift cable to move a shift sprocket of the derailleur to shift a chain to flywheels of different sizes, meaning different gear ratios. The derailleur includes two pulleys, of which one pulley serves as a tensioner to prevent the chain from getting slackening during shifting.

However, such a known bicycle rear derailleur has the following disadvantages:

(1) A front portion of the chain is connected through sprocket coupling to crank sprockets, while a rear portion is connected through sprocket coupling to a flywheel. The chain on the flywheel must be in alignment with the derailleur in order to demonstrate the greatest efficiency. Actually, alignment can be good for middle speeds, yet for high and low speeds, leftward/rightward shift is relatively great, such that misalignment causes the chain to bend sideways. This induces abrasion and reduces rolling efficiency. Speed shifting is often unsmooth and gets jammed. Consequently, speed shifting become difficult and also, this makes it hard to install flywheels of different gear ratios.

(2) The derailleur is mounted on the bottom of the rear wheel hub and is not enclosed and is directly exposed, directly contacting the ground, dust, and mud. Particularly, the stretching spring that provides the chain tension for the derailleur may easily be corroded, leading to damage and malfunction.

(3) The lower pulley of the derailleur is relatively close to the ground surface and may be easily damaged due to impact.

SUMMARY OF THE INVENTION

An objective of the present invention is to provide a bicycle derailleur structure that includes a screw rod operable to drive a gear shift unit, prevents sideway bending of a chain to gain a maximum efficiency, smoothens gear shifting and speed varying, enables increase of available speed positions for speed varying, reduces probability of damage and malfunction, prevents a distance between the gear shift unit and the ground surface from being excessively short, and reduces impact with ground and damage.

To achieve the above objective, the present invention provides a bicycle derailleur structure that comprises at least one support arm, a screw rod, a tension bar, a gear shift unit, and a drive unit, wherein the support arm has one end mounted to a bicycle frame; the screw rod has one end mounted to the support arm; the tension bar has an end having an interior space in which an elastic member, is arranged, such that by means of the elastic member, the tension bar is mounted on the support arm in an elastically oscillating manner, the tension bar having an opposite end that is provided with a guide rod; the gear shift unit comprises two protector plates, a first pulley, and a second pulley, the two protector plates being combined together as a one-piece structure having a portion coupled, through threading engagement, to the screw rod, and another portion through which the guide rod extends in a movable manner, the first pulley and the second pulley being arranged between the two protector plates, a chain being wound around the first pulley and the second pulley; and the drive unit is mounted on the support arm to drive the screw rod to rotate.

The efficacy that the present invention provides is as follows:

(1) The screw rod is arranged to drive the gear shift unit for causing it to move and rotate to drive a chain on the flywheel unit to get align with the gear shift unit, preventing sideways bending of the chain to gain the maximum efficiency, smoothening gear shifting and speed varying, and enabling increase of flywheels of different gear ratios to increase the available positions for speed varying.

(2) A main portion of an elastic member that provides tension to the gear shift unit is not directly exposed to the outside, and protector plates are arranged to protect a first pulley and a second pulley so as to reduce the probability of damage and failure.

(3) The distance between the gear shift unit and the ground surface is prevented from being excessively short so as to reduce impact and damage.

DETAILED DESCRIPTION OF THE PREFERRED EMBODIMENT

Figure 1:
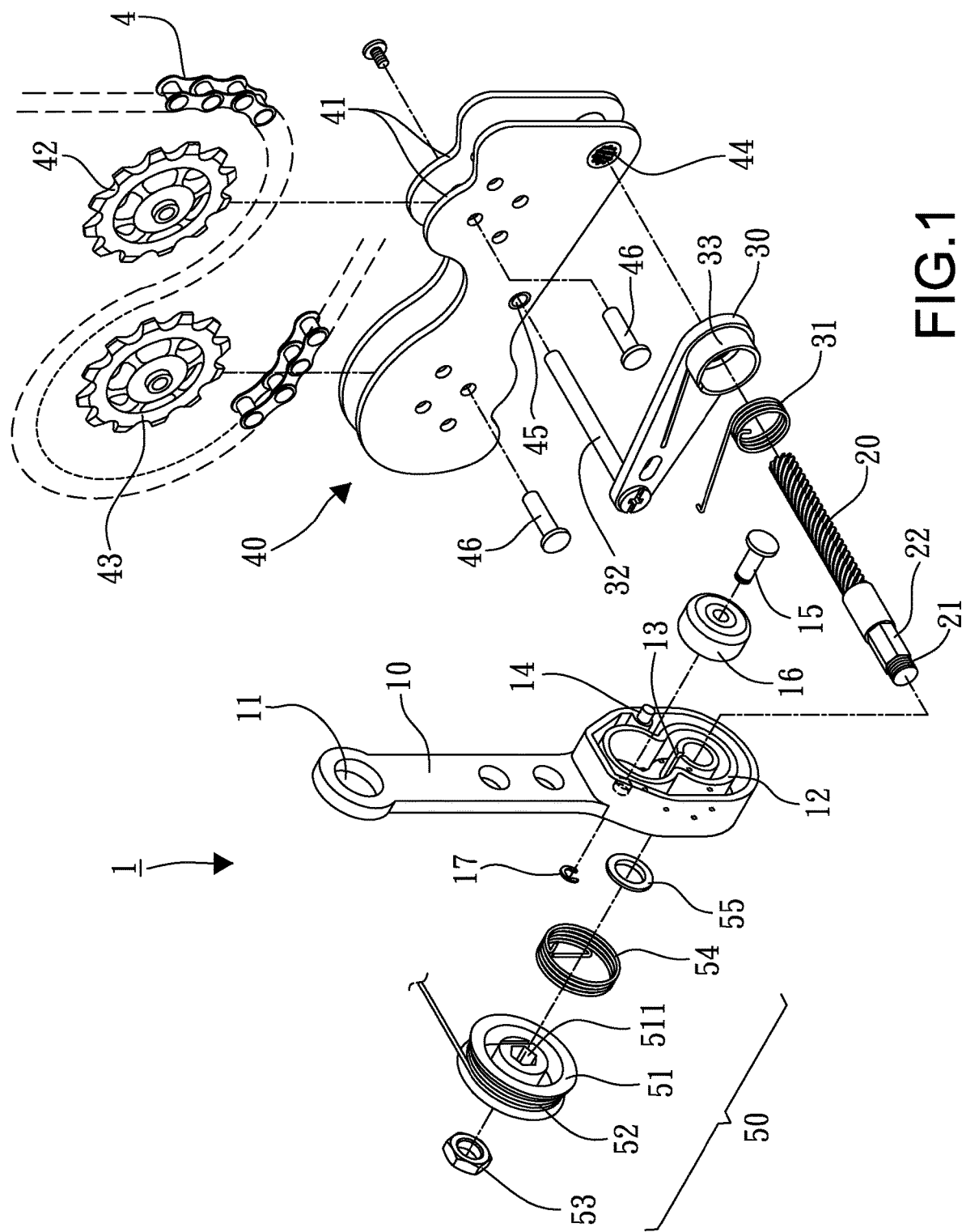
FIG. 1 is an exploded view of the present invention.
Figure 2:
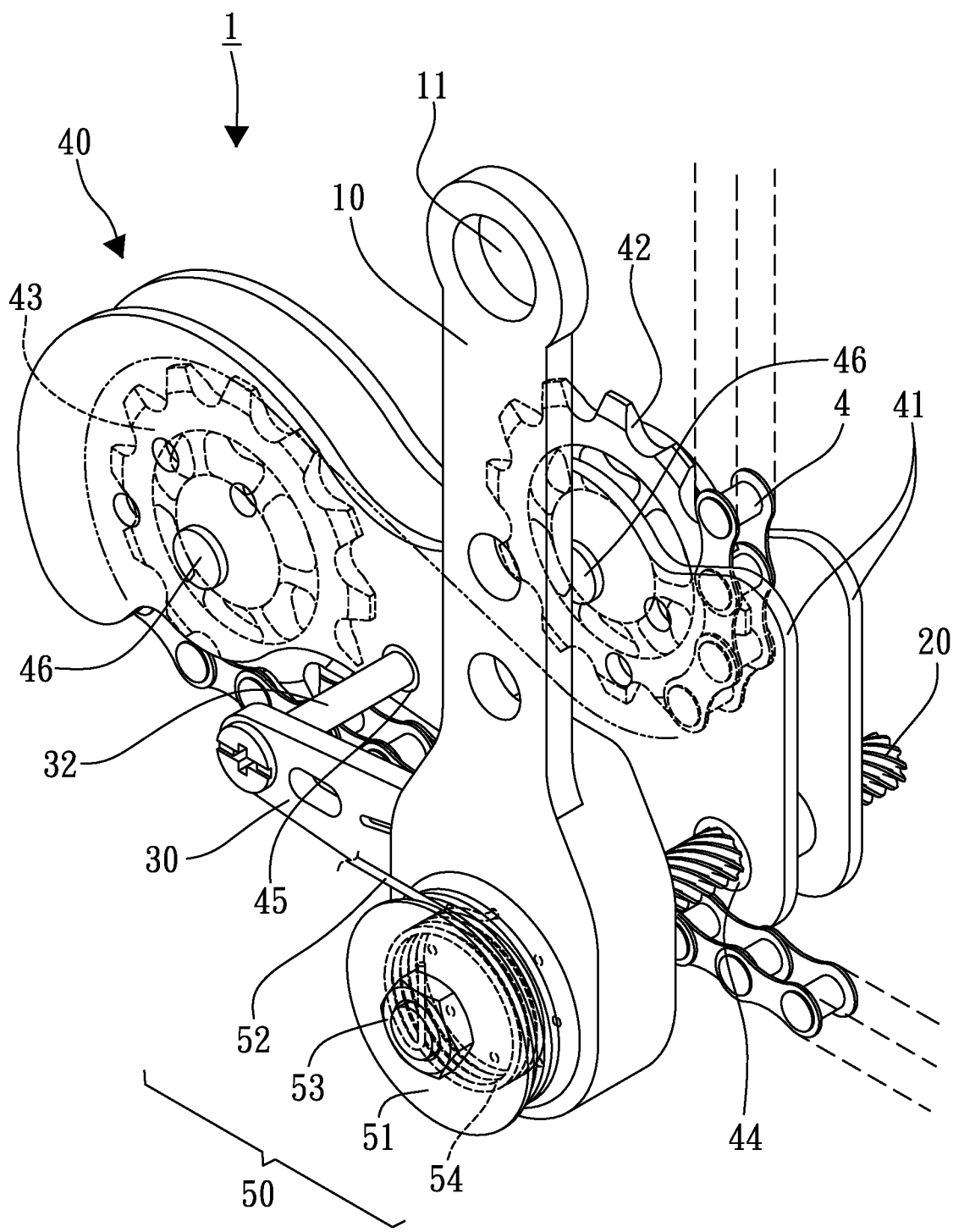
FIG. 2 is a perspective view of the present invention.
Figure 3:
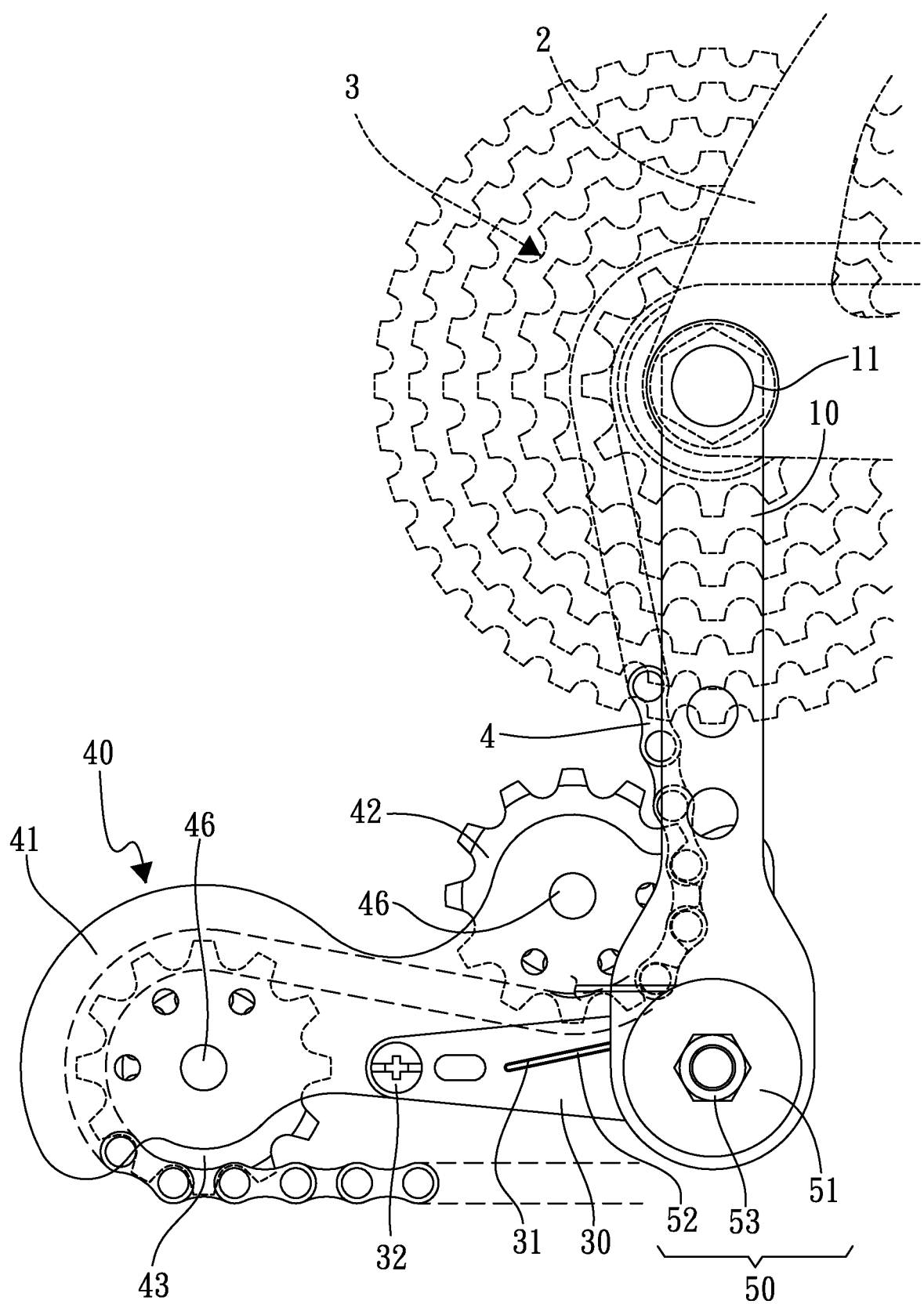
FIG. 3 is a side elevational view of the present invention.
Figure 4:
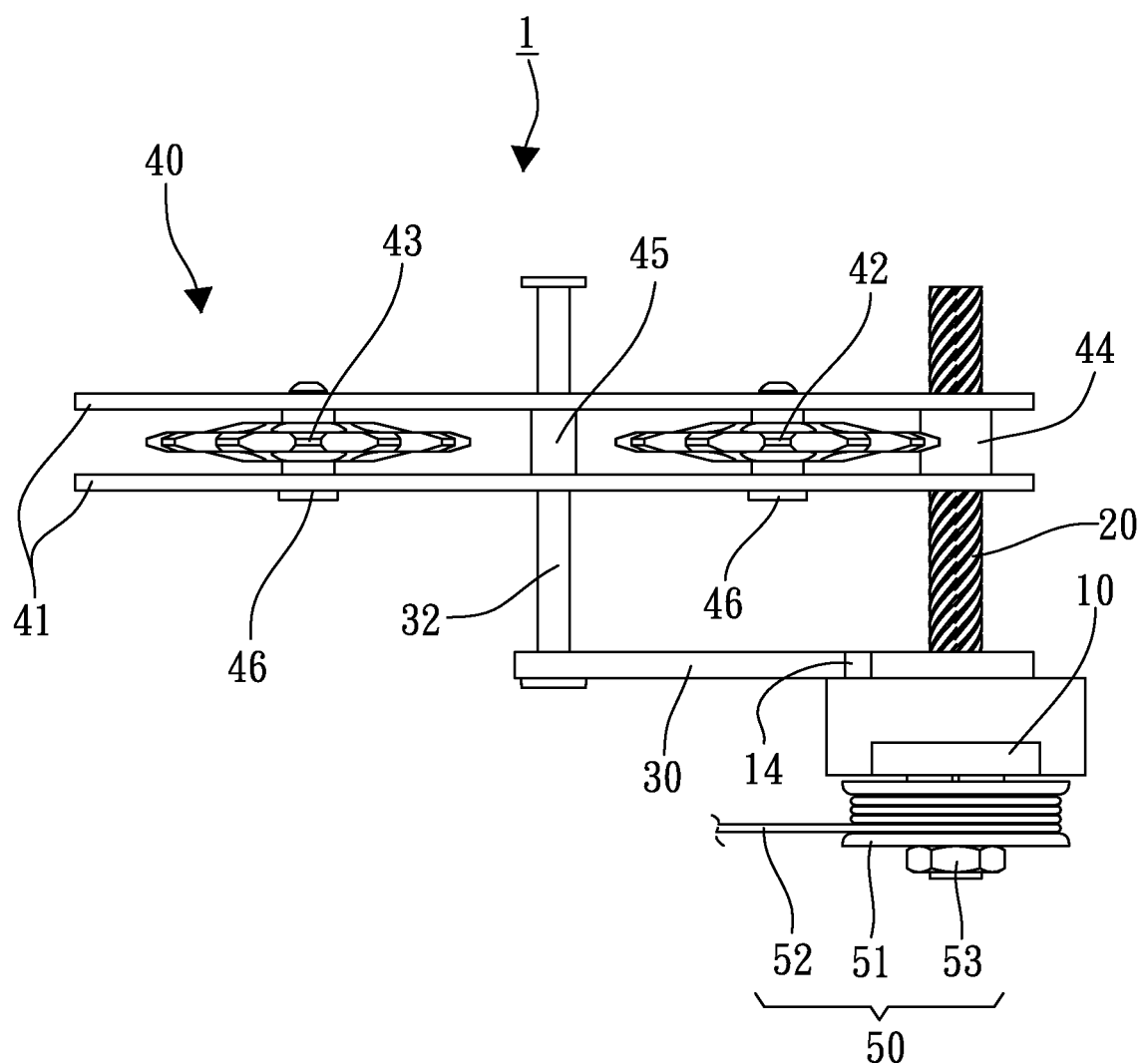
FIG. 4 is a top plan view of the present invention.

Referring to FIGS. 1-4, a bicycle derailleur 1 according to the present invention is mountable on a bicycle frame 2 to correspond to a flywheel unit 3. Structurally, the bicycle derailleur 1 includes at least one support arm 10, a screw rod 20, a tension bar 30, a gear shift unit 40, and a drive unit 50, of which details are provided below:

The support arm 10 has an end mounted to the bicycle frame 2.

The screw rod 20 has an end mounted to the support arm 10.

The tension bar 30 has an end having an interior space in which an elastic member 31 is arranged, such that by means of the elastic member 31, the tension bar 30 is mounted on the support arm 10 in an elastically oscillating manner, and the tension bar 30 has an opposite end that is provided with a guide rod 32.

The gear shift unit 40 includes two protector plates 41, a first pulley 42, and a second pulley 43, the two protector plates 41 being combined as an integrated one-piece structure that has a portion coupled, through threading engagement, to the screw rod 20 and another portion through which the guide rod 32 extends, in a movable manner, the first pulley 42 and the second pulley 43 being arranged between the two protector plates 41, a chain 4 being wound around the first pulley 42 and the second pulley 43.

The drive unit 50 is mounted on the support arm 10 to drive the screw rod 20 to rotate.

The support arm 10 is formed, in one end thereof, with a fitting hole 11, in order to fit to and fixed on the bicycle frame 2 by means of the fitting hole 11.

The support arm 10 has one side that is formed with a holed seat 12 arranged in a concentric form and an engagement notch portion 13. The tension bar 30 is provided, on one end thereof, with a rim 33, and the rim 33 forms, in an interior space thereof, with a trough for receiving and mounting the elastic member 31. The rim 33 is pivotally connected to the holed seat 12 in a movable manner. The elastic member 31 may comprise a torsion spring, and one end of the elastic member 31 is received and retained in the engagement notch portion 13, while an opposite end of the elastic member 31 extends through the rim 33 to fix to a surface of the tension bar 30.

As such, a main portion of the elastic member 31 that provides the shifting tension for the gear shift unit 40 is set in a concealed manner and does not directly expose to the outside, making it does not directly contact dust and mud to thereby prevent corrosion and to reduce the potential risk of damage and malfunction of the bicycle derailleur.

Figure 5:
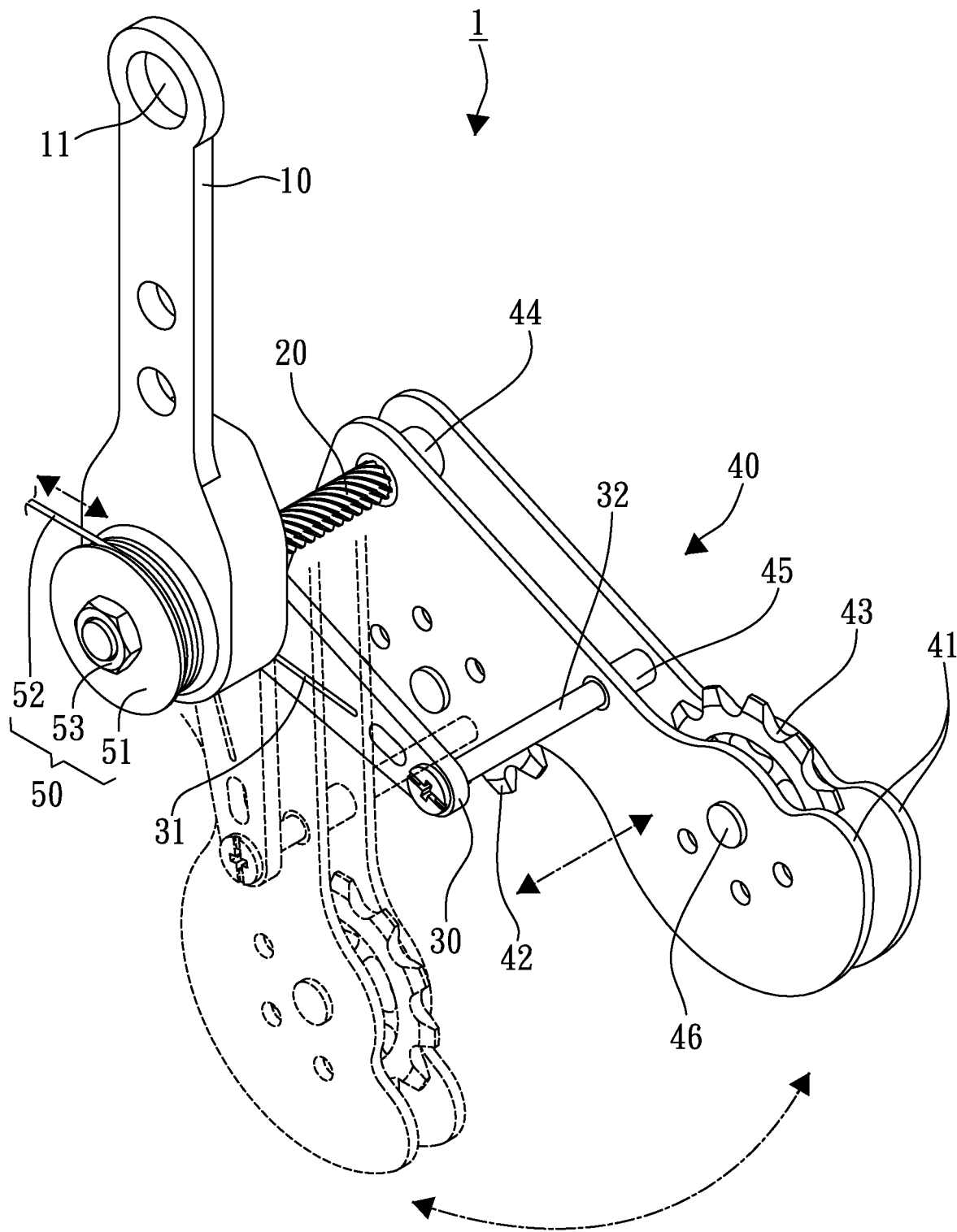
FIGS. 5-8 are schematic views illustrating operation of the present invention.
Figure 6:
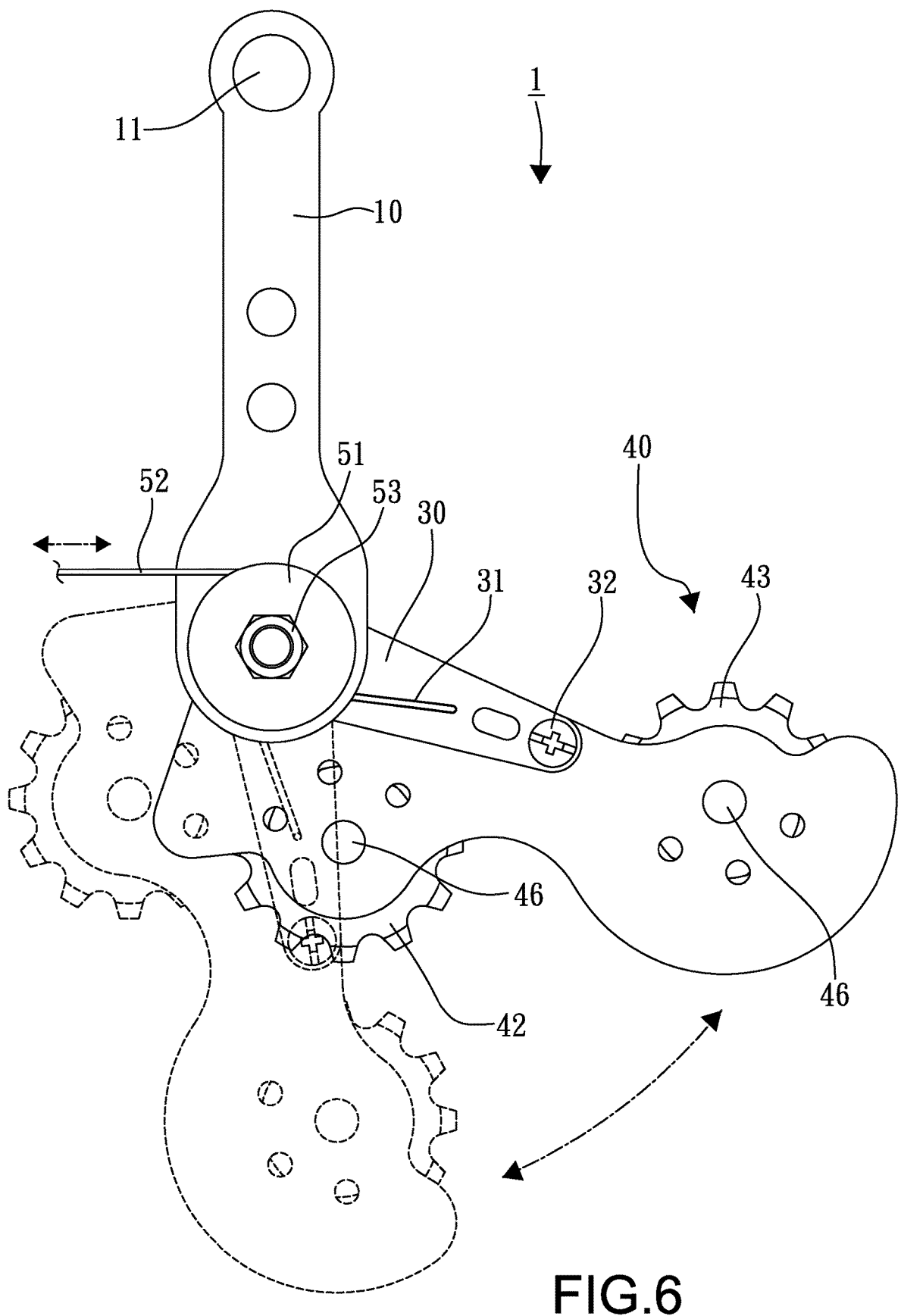
Figure 7:
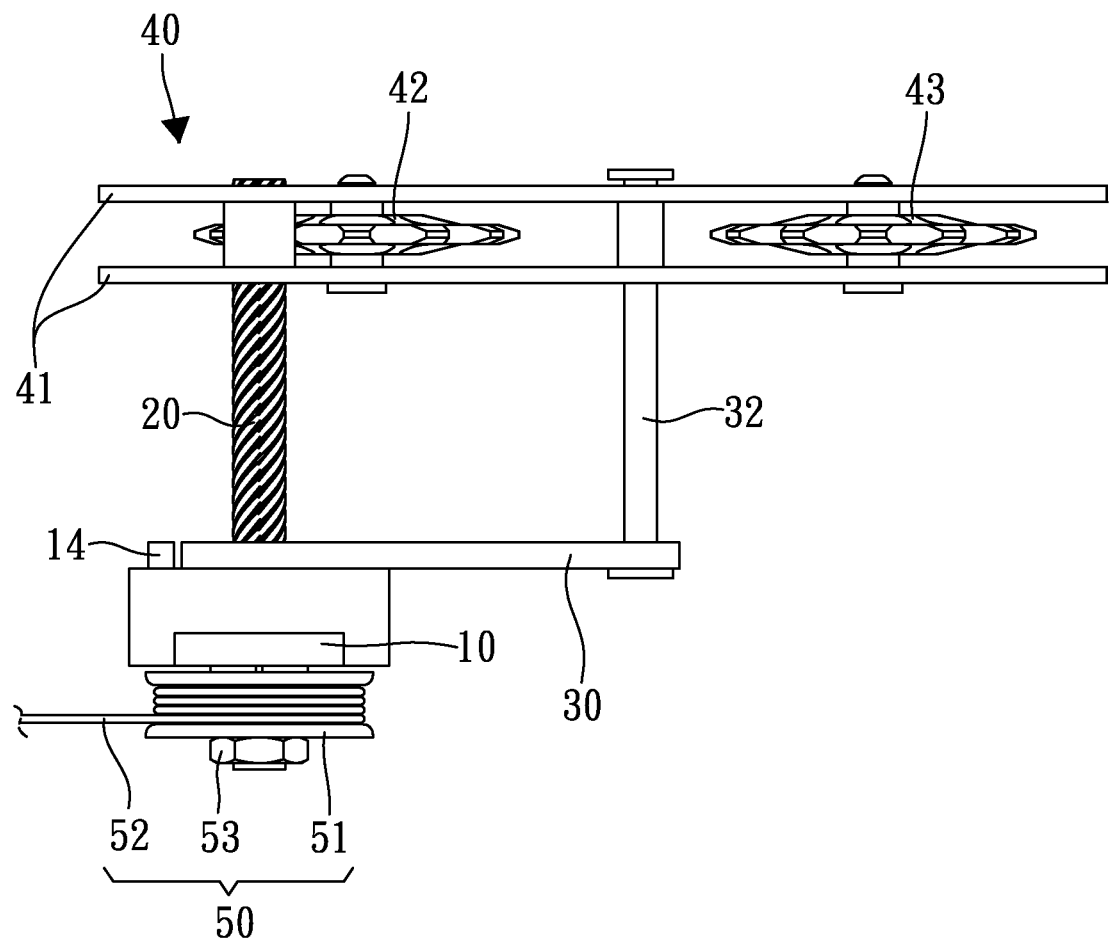

Thus, the spring effect of the elastic member 31 keeps the tension bar 30 elastically oscillate or swing in one single direction, and the guide rod 32 provides a shifting tension to the gear shift unit 40. When the gear shift unit 40, by means of movement and rotation thereof, carries out a chain-shifting and speed-varying operation, reference being had to FIGS. 5 and 6, the chain 4 is shifted to flywheels of different sizes, and the acting force of the guide rod 32 causes the tension bar 30 to elastically oscillate or swing in an opposite direction, and under such a condition, the elastic member 31 of the tension bar 30 accumulates up an elastic restoration force and also supplies, by means of the guide rod 32, a shifting tension to the gear shift unit 40, and when the acting force of the guide rod 32 is reduced, the tension bar 30 may elastically restore by means of the spring force.

To further describe, when the gear shift unit 40, by means of movement and rotation thereof, carries out a chain-shifting and speed-varying operation, the chain 4 is shifted to flywheels of different sizes, and the tension bar 30 is elastically oscillating or swinging to provide a shifting tensioning force, by means of the guide rod 32, to the gear shift unit 40, and the gear shift unit 40 applies an appropriate force to tension the chain 4, so as to prevent the chain 4 from getting slackening for one time and tightening for another time during the chain-shifting and speed-varying operation.

The support arm 10 is provided, at one side thereof, with a stop portion 14, which functions to stop the guide rod 32, in order to provide an effect of position retaining for the tension bar 30.

As such, by means of the stop portion 14, the tension bar 30 being driven by the spiring effect of the elastic member 31 to oscillate or swing to exceed a preset angle can be prevented.

A pivot pin 15 penetrates through the support arm 10. The pivot pin 15 is movably pivoted to a tensioner 16, and one end of the pivot pin 15 is provided with a pin clip 17 for clipping and retaining, achieving an effect of stopping a surface of the support arm 10, to constrain the pivot pin 15. The tensioner 16 is set at a position without being sliding or falling off. The tensioner 16 is an elastic pully selected from an elastic material, and a surface of the tensioner 16 is set in contact engagement with the rim 33 that is at one end of the tension bar 30.

As such, when impact forces induced by the bicycle being ridden on a bumpy and irregular road surface act on the tension bar 30, the tensioner 16 automatically and slightly rotates and induces, with respect to the rim 33, resisting frictional force or sticking force that applies a cushioning effect on the tension bar 30 to reduce an oscillation angle, preventing improper or excessive oscillation or vibration of the tension bar 30 from causing detaching of the chain 4.

Two protector plates 41 of the gear shift unit 40 are joined together by a threaded sleeve 44 to form a one-piece structure, and include a threaded sleeve 44 for threading connection with the screw rod 20. Thus, a threading guide effect induced by rotation of the screw rod 20 drives the gear shift unit 40 to achieve an effect of driving.

Two protector plates 41 of the gear shift unit 40 are joined together by a rod sleeve 45 to form a one-piece structure, and also allows, by means of the rod sleeve 45, the guide rod 32 to movably penetrate therein.

When the gear shift unit 40 moves and rotates, the guide rod 32 provides an effect of guiding, and mutual acting forces between the tension bar 30 and the gear shift unit 40 can be transmitted through the guide rod 32.

The first pulley 42 and the second pulley 43 are movably pivoted, by means of penetration of axles 46, between the two protector plates 41.

The drive unit 50 can be of a manual control structure. The drive unit 50 includes a cable wheel 51, a shift cable 52, a nut 53, a torsion spring 54, and a washer 55. One end of the shift cable 52 is fixed to and wound around the cable wheel 51, and another end of the shift cable 52, which is not shown in the drawings, is connected to a known manually-operated shift lever mounted on a handlebar. The cable wheel 51 is provided with a polygonal hole 511. One end of the screw rod 20 is provided with a threaded portion 21 and a polygonal portion 22. The screw rod 20 is first penetrating through and pivotally connected to the support arm 10, and then, the threaded portion 21 is screwed to the nut 53. The polygonal portion 22 and the polygonal hole 511 are fit to each other to have the screw rod 20 connected to and fixed with the cable wheel 51. And, one end of the torsion spring 54 is fixed to the cable wheel 51, and another end of the torsion spring 54 is fixed to a side surface of the support arm 10, such that after the shift cable 52 is operated to pull the cable wheel 51 to rotate or to release it, the torsion spring 54 releases an elastic restoration force to keep the cable wheel 51 tensioning the shift cable 52. The washer 55 is arranged between one side surface of the support arm 10 and the cable wheel 51 to provide an effect of anti-abrasion. Thus, a rider may operate the manually-operated shift lever to pull, by means of the shift cable 52, the cable wheel 51 to rotate thereby driving the screw rod 20 to rotate.

The above provides a description of the components of the present invention, and the assembly thereof, and in the following an example of use of the present invention, and also features and advantages, will be described:

Referring to FIGS. 3-7, a rider, when attempting to change speed through gear shifting, moves the chain 4 to flywheels of different sizes, meaning different gear ratios, such that the drive unit 50 drives the screw rod 20 to rotate in one direction to, in collaboration with the guide rod 32, drive the gear shift unit 40 to make it move and rotate. The gear shift unit 40 drives, at the same time, the chain 4 on the flywheel unit 3 to align with the gear shift unit 40, and also, the gear shift unit 40 applies a proper force to tension the chain 4, making the chain 4 not inducing a situation of slackening for one time and tightening for another time resulting from chain shifting and speed varying, preventing the chain 4 from sideway bending to obtain the maximum efficiency, and to make chain shifting and speed varying smooth, and to enable installation of extra flywheels of different gear ratios, so as to increase the positions of gear shifting.

Figure 8:
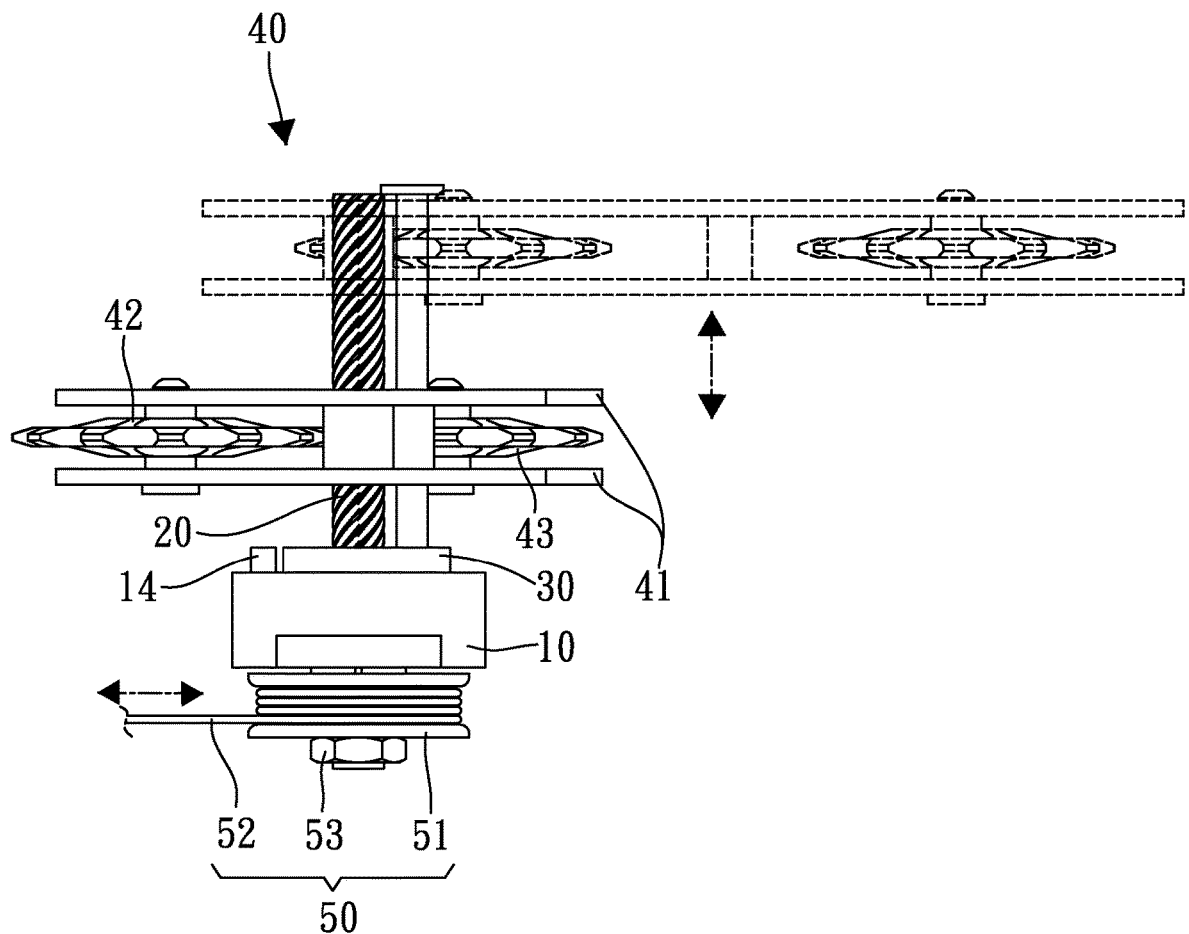

Referring to FIG. 8, with an attempt to make lever shifting for speed varying, the rider operates the drive unit 50 to drive the screw rod 20 to rotate toward an opposite direction, meaning driving the gear shift unit 40 to move and rotate toward the original position, in other words the gear shift unit 40 smoothly shifts the chain 4 from a large diameter flywheel to a small diameter flywheel, or from a small diameter flywheel to a large diameter flywheel.

The efficacy of the present invention is that a main portion of the elastic member 31 that provides tension for the gear shift unit 40 is not directly exposed to the outside, and the protector plates 41 protect the first pulley 42 and the second pulley 43 to reduce risk of damage and probability of failure, and also to achieve preventing the first pulley 42 and the second pulley 43 of the gear shift unit 40 from being spaced from the ground surface too short to thereby reduce impact and damage.

Figure 9:
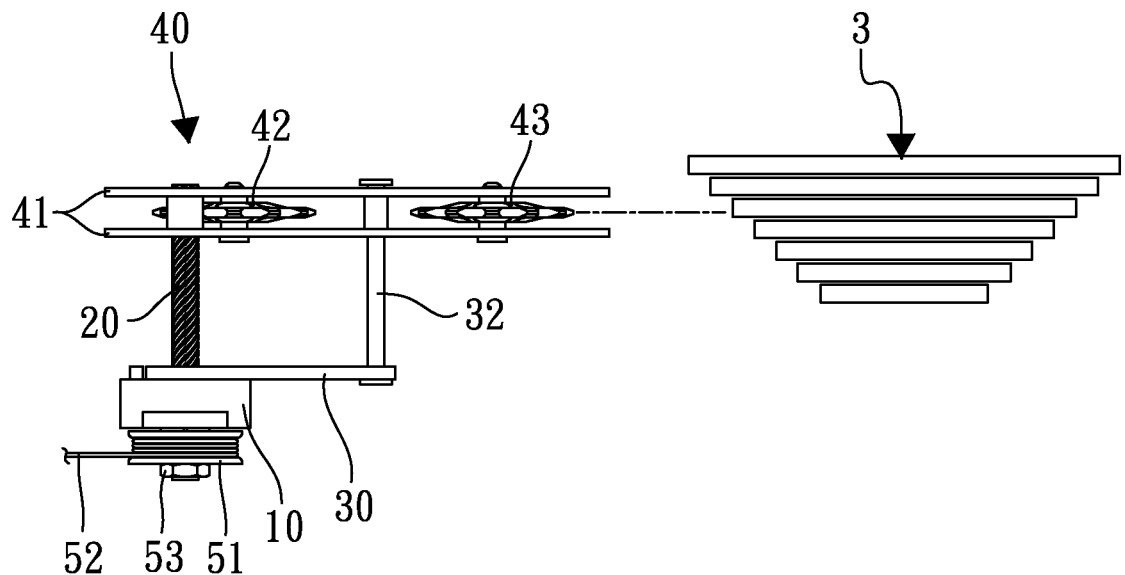
FIG. 9 is a schematic view illustrating an embodiment in which a screw rod and a guide rod are formed in a parallel arrangement with respect to a rotational axis of a flywheel unit according to the present invention.

Referring to FIG. 9, in an embodiment, the screw rod 20 and the guide rod 32 are formed in a parallel arrangement with respect to a rotational axis of the flywheel unit 3, so as to provide the gear shift unit 40 with a parallel movement stroke.

Figure 10:
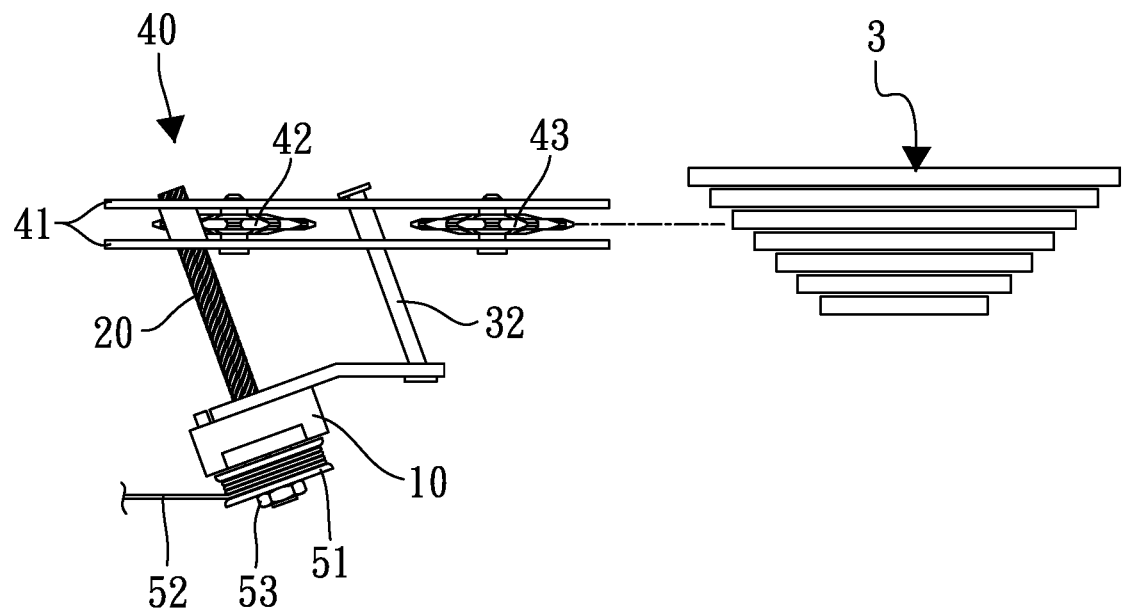
FIG. 10 is a schematic view illustrating another embodiment in which a screw rod and a guide rod are formed in an inclined angle arrangement with respect to a rotational axis of a flywheel unit according to the present invention.

Referring to FIG. 10, in another embodiment, the screw rod 20 and the guide rod 32 are formed in an inclination angle arrangement with respect to the rotational axis of the flywheel unit 3, so as to provide the gear shift unit 40 with an inclined angle movement stroke, of which the inclined angle movement stroke sets movement in an inclined angle for shifting from a large diameter one of the flywheels of the flywheel unit 3 to a small diameter one of the flywheels, and after chain shifting and speed varying implemented with the chain 4 wound around the first pulley 42 and the second pulley 43, the gear shift unit 40 can get as close as possible to one side of the flywheel unit 3, thereby achieving an effect that the chain, for a given length, can be applied more pieces of flywheels of different diameters for speed varying, for example the gear shift unit 40 being applicable to seven (7) flywheels in parallel movement stroke, and being applicable to thirteen (13) flywheels in inclined angle movement stroke, so as to increase additional flywheels of different gear ratios.

Figure 11:
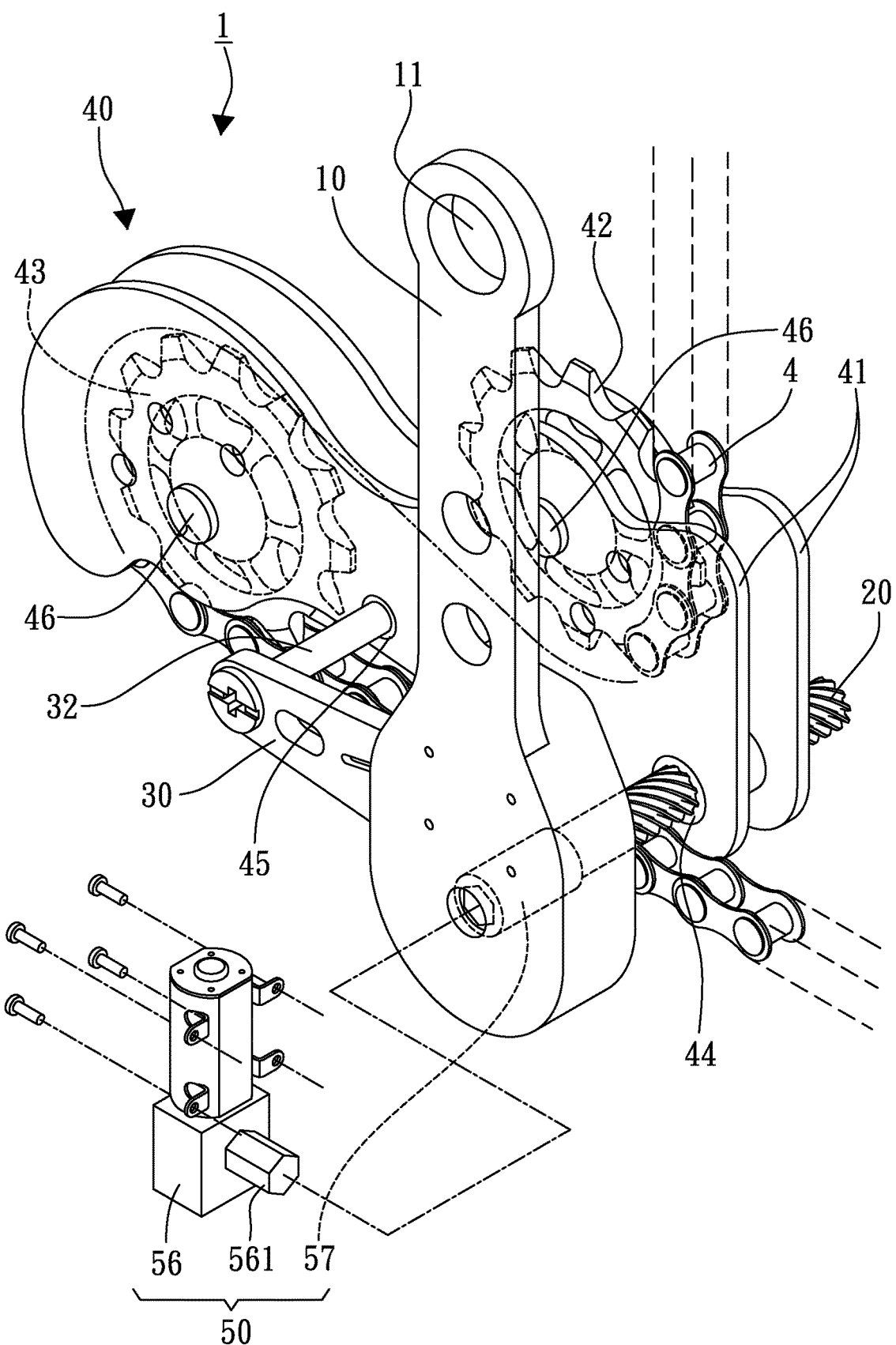
FIG. 11 is a schematic view showing a structure of another embodiment of the present invention.

Referring to FIG. 11, in a further embodiment, the drive unit 50 is of an automatic control structure. The drive unit 50 includes a servo reduction motor 56 and a drive sleeve 57, wherein the servo reduction motor 56 is mounted, by threaded fasteners, to one side surface of the support arm 10, the servo reduction motor 56 being provided with a polygonal output shaft 561, the drive sleeve 57 being arranged at one end of the screw rod 20 and fit to and fixed to the output shaft 561. Consequently, the servo reduction motor 56 may operate the output shaft 561 to rotate at a low rotational speed to drive, by means of the drive sleeve 57, the screw rod 20 to rotate to achieve the purposes of driving the screw rod 20 in an automatic control manner, thereby providing the gear shift unit 40 with an effect of electrically-operated derailing. The rider may operate an electrically-operated shift lever to control, in a wired or wireless manner, the servo reduction motor 56.

Figure 12:
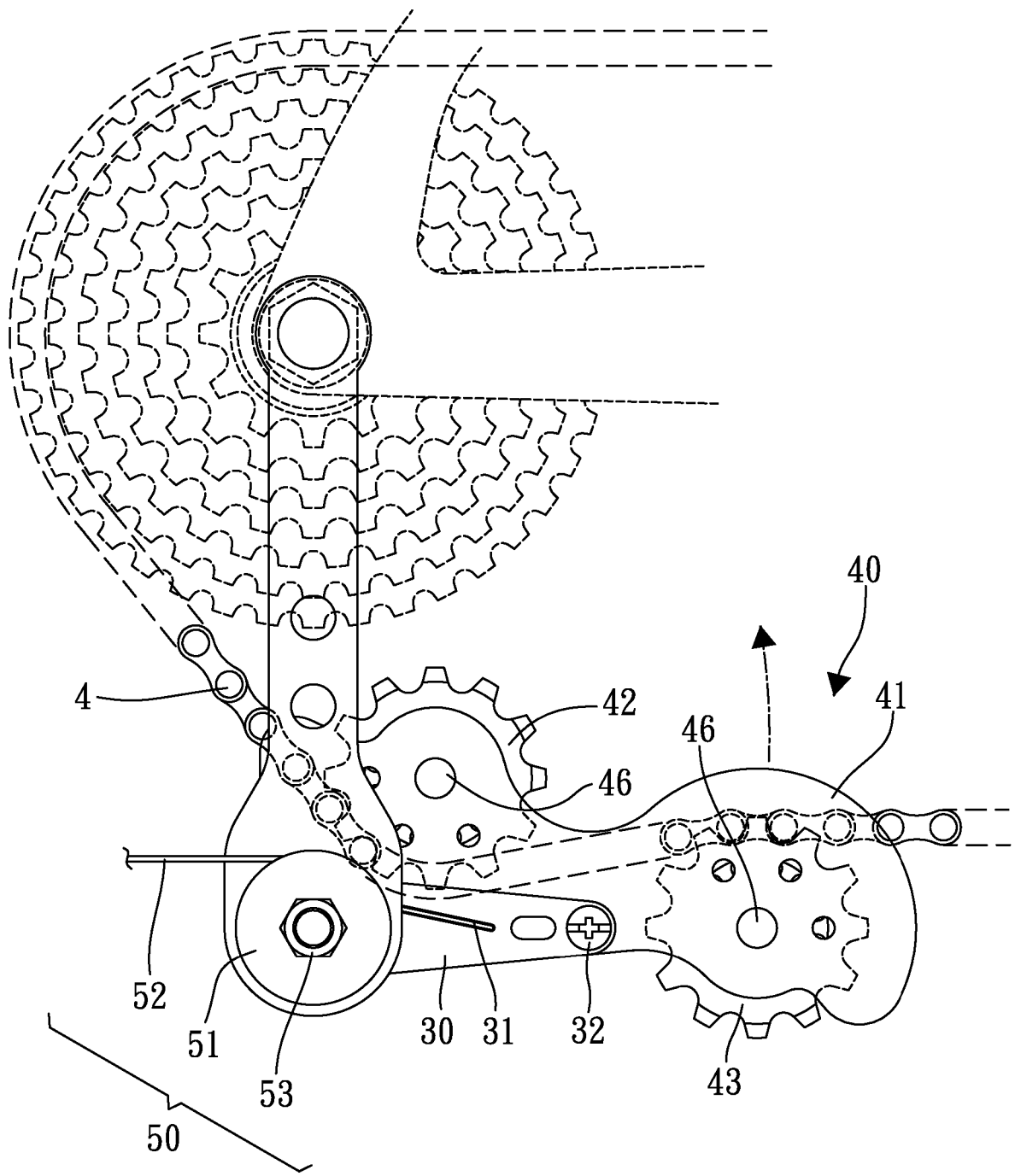
FIG. 12 is a schematic view showing a mounting structure of another embodiment of the present invention.

Referring to FIG. 12, in yet a further embodiment, the tension bar 30 and the gear shift unit 40 are arranged to be close to horizontal from the ground surface, such that a stroke of the gear shift unit 40 of speed varying is oscillating away from the ground surface. As such, the lowest position of the tension bar 30 and the gear shift unit 40 in an idle, non-operative condition and chain-shifting speed-varying condition, is constrained to be close to being horizontal, constantly keeping a relatively long distance from the ground surface. When the bicycle is turning or travelling on a bumpy and irregular road surface, damage of the tension bar 30 and the gear shift unit 40 from impact by the ground can be reduced.

In summary, the bicycle derailleur structure design according to the present invention uses the screw rod to drive the gear shift unit, preventing the chain from bending sideways so as to gain the maximum efficiency, achieving smooth chain shifting and speed varying, enabling an increase of available speed positions, and preventing the distance between the gear shift unit and the ground surface from being excessively short to reduce the concern of impact with the ground, thereby providing industrial utilization.

I claim:

1. A bicycle derailleur structure, comprising at least one support arm, a screw rod, a tension bar, a gear shift unit, and a drive unit,
   wherein the support arm has one end mounted to a bicycle frame;
   the screw rod has one end mounted to the support arm;
   the tension bar has an end having an interior space in which an elastic member, is arranged, such that by means of the elastic member, the tension bar is mounted on the support arm in an elastically oscillating manner, the tension bar having an opposite end that is provided with a guide rod;
   the gear shift unit comprises two protector plates, a first pulley, and a second pulley, the two protector plates being combined together as a one-piece structure having a portion coupled, through threading engagement, to the screw rod, and another portion through which the guide rod extends in a movable manner, the first pulley and the second pulley being arranged between the two protector plates, a chain being wound around the first pulley and the second pulley; and
   the drive unit is mounted on the support arm to drive the screw rod to rotate.

2. The bicycle derailleur structure according to claim 1, wherein the support arm has one side that is formed with a holed seat and an engagement notch portion, the tension bar being provided, on one end thereof, with a rim, the rim forming, in an interior space thereof, with a trough for receiving and mounting the elastic member, the rim being pivotally connected to the holed seat in a movable manner, the elastic member being a torsion spring, the elastic member having one end received and retained in the engagement notch portion, and an opposite end extending through the rim to fix to a surface of the tension bar.

3. The bicycle derailleur structure according to claim 2, wherein the support arm is provided, at one side thereof, with a stop portion, which functions to stop the guide rod, in order to provide an effect of position retaining for the tension bar.

4. The bicycle derailleur structure according to claim 2, wherein a pivot pin penetrates through the support arm, the pivot pin being movably pivoted to a tensioner, one end of the pivot pin being provided with a pin clip, the tensioner being an elastic pully selected from an elastic material, a surface of the tensioner being set in contact engagement with the rim at one end of the tension bar.

5. The bicycle derailleur structure according to claim 1, wherein the two protector plates of the gear shift unit are joined together by a threaded sleeve to form a one-piece structure, and include a threaded sleeve for threading connection with the screw rod.

6. The bicycle derailleur structure according to claim 1, wherein the two protector plates of the gear shift unit are joined together by a rod sleeve 45 to form a one-piece structure, and allows, by means of the rod sleeve, the guide rod to movably penetrate therein.

7. The bicycle derailleur structure according to claim 1, wherein the first pulley and the second pulley are movably pivoted, by means of penetration of axles, between the two protector plates.

8. The bicycle derailleur structure according to claim 1, wherein the drive unit comprises a manual control structure, the drive unit comprising a cable wheel, a shift cable, a nut, a torsion spring, and a washer, one end of the shift cable being fixed to and wound around the cable wheel, another end of the shift cable being connected to a manually-operated shift lever mounted on a handlebar, the cable wheel being provided with a polygonal hole, one end of the screw rod being provided with a threaded portion and a polygonal portion, the screw rod penetrating through and pivotally connected to the support arm and the threaded portion being screwed to the nut, the polygonal portion and the polygonal hole being fit to each other to have the screw rod connected to and fixed with the cable wheel, one end of the torsion spring being fixed to the cable wheel, another end of the torsion spring being fixed to a side surface of the support arm, such that after the shift cable pulls or releases the cable wheel for rotation, the torsion spring releases an elastic restoration force to keep the cable wheel tensioning the shift cable, the washer being arranged between one side surface of the support arm and the cable wheel.

9. The bicycle derailleur structure according to claim 1, wherein the screw rod and the guide rod are arranged to form a condition of being of an inclination angle with respect to a rotational axis of the flywheel unit, so as to provide the gear shift unit with an inclined angle movement stroke.

10. The bicycle derailleur structure according to claim 1, wherein the drive unit comprises an automatic control structure, the drive unit comprising a servo reduction motor and a drive sleeve, the servo reduction motor being mounted by threaded fasteners to one side surface of the support arm, the servo reduction motor being provided with a polygonal output shaft, the drive sleeve being arranged at one end of the screw rod and fit to and fixed to the output shaft.

\* \* \* \* \*